(12) United States Patent
Hingorani

(10) Patent No.: US 12,060,545 B2
(45) Date of Patent: Aug. 13, 2024

(54) DECANTER SYSTEM AND METHOD

(71) Applicant: Arun Hingorani, Sterling Heights, MI (US)

(72) Inventor: Arun Hingorani, Sterling Heights, MI (US)

(*) Notice: Subject to any disclaimer, the term of this patent is extended or adjusted under 35 U.S.C. 154(b) by 263 days.

(21) Appl. No.: 17/121,888

(22) Filed: Dec. 15, 2020

(65) Prior Publication Data

US 2022/0186163 A1 Jun. 16, 2022

(51) Int. Cl.
- *B65D 39/00* (2006.01)
- *C12G 1/00* (2019.01)
- *C12G 3/06* (2006.01)
- *C12G 3/07* (2006.01)
- *C12H 1/22* (2006.01)

(52) U.S. Cl.
CPC ............. *C12H 1/22* (2013.01); *B65D 39/007* (2013.01); *C12G 1/00* (2013.01); *C12G 3/06* (2013.01); *C12G 3/07* (2019.02)

(58) Field of Classification Search
CPC .......... C12G 3/06; C12G 3/07; B65D 39/007; B65D 39/0052; B65D 39/0058; B65D 39/0064; B65D 39/0076; B65D 39/04; B65D 2539/006; B65D 2539/008; B65D 41/265
USPC ....................................................... 215/364
See application file for complete search history.

(56) References Cited

U.S. PATENT DOCUMENTS

| | | | | |
|---|---|---|---|---|
| 66,290 A | * | 7/1867 | Bocemsdes | B65D 47/0847 215/307 |
| 95,025 A | * | 9/1869 | Kitchen | B65D 45/28 215/290 |
| 633,468 A | * | 9/1899 | McCarty | B65D 51/1683 215/262 |
| 650,617 A | * | 5/1900 | Salomon | B65D 25/48 251/210 |
| 709,162 A | * | 9/1902 | Koscherak | B65D 45/24 215/364 |
| 715,345 A | * | 12/1902 | Brewington | B65D 39/16 215/364 |
| 926,895 A | * | 7/1909 | Quillot | B65D 39/16 215/364 |

(Continued)

FOREIGN PATENT DOCUMENTS

| | | | | |
|---|---|---|---|---|
| CH | | 692540 A5 * | 7/2002 | ............. B65D 39/16 |
| WO | WO-2011153316 A2 * | | 12/2011 | ......... B65D 39/0029 |

*Primary Examiner* — Allan D Stevens
(74) *Attorney, Agent, or Firm* — Jacob M. Ward; Ward Law Office LLC

(57) ABSTRACT

A decanter system can include a decanter and a stopper. The decanter can include a decanter body and a neck. A mouth can be formed in the neck. The stopper can include a sealing member. The stopper can be configured to be selectively disposed in the mouth to form a seal between the sealing member and the mouth. The stopper is positionable in the mouth between a first position and a second position where the seal is maintained in each of the first position and the second position. A method of storing liquid can include providing a decanter system. A liquid can be disposed in the decanter body. A filter with flavoring materials disposed therein can be placed within the decanter body. The decanter can be sealed with the stopper in the first position. The stopper can be pushed downwards in the mouth to the second position, repeatedly as desired.

12 Claims, 5 Drawing Sheets

(56) References Cited

U.S. PATENT DOCUMENTS

| | | | | |
|---|---|---|---|---|
| 2,696,319 A | * | 12/1954 | Menefee | B65D 39/0094 |
| | | | | 215/364 |
| 2,705,573 A | * | 4/1955 | Zepelovitch | B65D 39/007 |
| | | | | 215/361 |
| D178,345 S | * | 7/1956 | Du Pree | D9/546 |
| D178,347 S | * | 7/1956 | Du Pree | D7/300 |
| 3,070,251 A | * | 12/1962 | Mangravite | B65D 47/125 |
| | | | | 215/45 |
| 3,073,473 A | * | 1/1963 | Davidson | B65D 39/0047 |
| | | | | 215/364 |
| 3,184,090 A | * | 5/1965 | Robinson | B65D 39/0076 |
| | | | | 215/364 |
| 5,361,922 A | * | 11/1994 | Moore | B01L 3/5021 |
| | | | | 422/918 |
| 2005/0167390 A1 | * | 8/2005 | Dubs | B65D 45/30 |
| | | | | 215/387 |
| 2015/0374151 A1 | * | 12/2015 | Lin | A47G 19/127 |
| | | | | 222/545 |
| 2020/0009047 A1 | * | 1/2020 | Dickie | A23L 2/02 |
| 2020/0359815 A1 | * | 11/2020 | McDaniel | B65D 23/0885 |

* cited by examiner

DECANTER SYSTEM AND METHOD

FIELD

The present disclosure relates generally to liquid storage devices, and more particularly, to a decanter system.

BACKGROUND

This section provides background information related to the present disclosure which is not necessarily prior art.

Decanters, for centuries, have been used only as a vessel to serve beverages such as wines and spirits that were taken out of a larger storage container, like an amphora or a barrel. Wines and spirits are stored in barrels for a period of time, to impart flavors and smooth out the sharpness of the base alcohol, by the aging process. This process can take years.

The shape of a decanter has generally been a long slender neck with a wide body. Decanters with stoppers have a narrow neck and are used for temporary storage of spirits. Wine carafes are used to aerate the wine before it is poured in a glass.

Oak staves and chips can be used inside barrels to expedite the aging process. Thin wood spirals and wood dust can be placed inside commercially available bottles with regular narrow necks to try to enhance the spirit in the bottle that it is sold in. A limitation with using barrels in the aging process is that the quantities in a barrel are large and the customer has to purchase an individual bottle that has been retrieved from the barrel and accept the flavor that comes out of the barrel. The wood dust or thin wood spiral in the bottle leaves the spirit with a limited superficial woody flavor.

There is a continuing need for a system and method for small scale aging of a liquid, which allows for flavor customization by a user.

SUMMARY

In concordance with the instant disclosure, ways of small scale aging of a liquid, such as a beverage, which allow for flavor customization by a user, have been surprisingly discovered.

The present technology relates to designs and uses of a decanter having a wide mouth and neck, and a stopper with a seal. Systems are provided that allow placement of aging and flavoring materials inside such decanters to significantly expedite the aging and enhancing of the liquid. The neck of the decanter allows the insertion of larger pieces and quantities of wood (e.g., charred or toasted wood), fruits, herbs, spices and other flavoring materials as desired. The larger pieces and quantities of the enhancing materials provide a larger available surface area that can expedite the aging and flavoring process. These materials can be enclosed in a filter to keep any sediment and unwanted pieces of the materials floating around in the liquid.

The decanter can have an angled mouth opening. The seal of the stopper can have a bulb like profile and can be made of a flexible rubber-like or elastomeric material which can also be a compressible foam cellular type. This bulb like profile can create a gap between the body of the seal and the stopper. When the stopper is pushed down, the flexible material can flex and compress between the angled mouth of the decanter and the angled stopper, closing the gap and allowing the stopper to move in a vertically downward motion. When the pressure on the stopper is released, the stopper can move back upward, without breaking the seal or opening the decanter.

Placement and vertical movement of the stopper into the angled mouth of the decanter can thereby create a mild pressure and release function inside the decanter, allowing the liquid to move in and out of flavoring materials, including pores of wood, fruits, spices or other flavoring products placed inside, just like the pressure changes created by seasonal temperature variations that affect the spirit in the barrel. However, unlike the barrel which has to wait for seasons to achieve this effect, this can be done as often as desired, even many times every day with the decanter. This action can more quickly draw out the flavors and age the liquid. The size and angle of the bulb, stopper, and the decanter mouth can be varied to create a larger or smaller volume, thereby increasing or decreasing the movement of the stopper and seal assembly, which in turn creates more movement of the liquid into and out of the flavoring materials. Since this can be accomplished with smaller quantities of liquid, it provides the consumer an opportunity to customize their preferred drink of choice.

In certain embodiments, a decanter system is provided that includes a decanter and a stopper. The decanter can include a decanter body and a neck. A mouth can be disposed on the neck. The stopper can include a sealing member. The stopper can be configured to be selectively disposed in the mouth to form a seal between the sealing member and the mouth. The stopper is positionable in the mouth between a first position and a second position where the seal is maintained in each of the first position and the second position.

In certain embodiments, a method of storing liquids is provided that includes providing a decanter system that includes a decanter and a stopper. The decanter can include a decanter body and a neck. A mouth can be disposed on the neck. The stopper can include a sealing member. The stopper can be configured to be selectively disposed in the mouth to form a seal between the sealing member and the mouth. The stopper is positionable in the mouth between a first position and a second position where the seal is maintained in each of the first position and the second position. Liquids can be disposed in the decanter body. A filter with flavoring materials disposed therein can be disposed in the decanter body. The decanter can be sealed with the stopper in the first position. The stopper can be pushed downwards in the mouth to the second position. The stopper can be cycled between the first position and the second position one or more times.

DRAWINGS

The drawings described herein are for illustrative purposes only of selected embodiments and not all possible implementations, and are not intended to limit the scope of the present disclosure.

DETAILED DESCRIPTION

Figure 1:
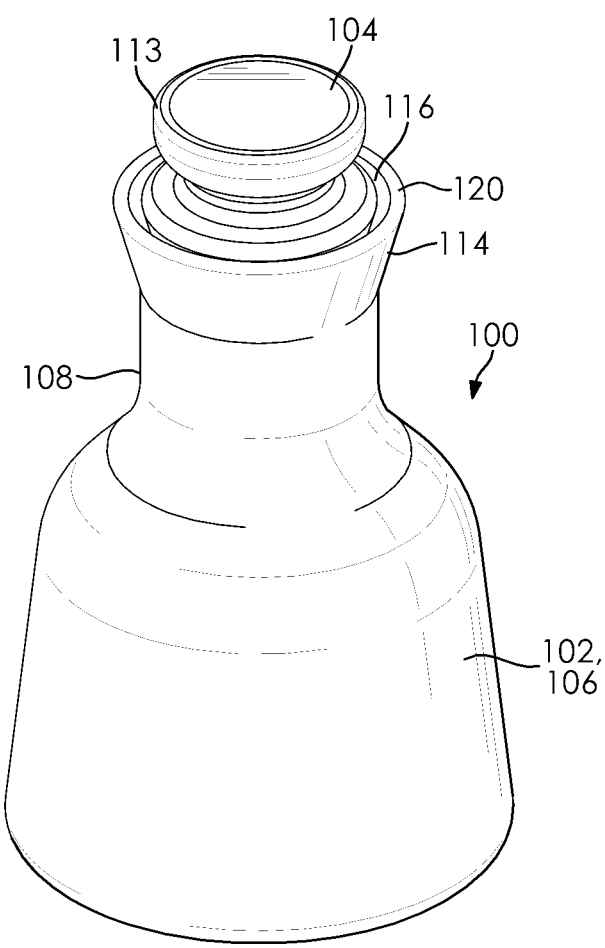
FIG. 1 is a top perspective view of a decanter system including a decanter and a stopper.
Figure 2:
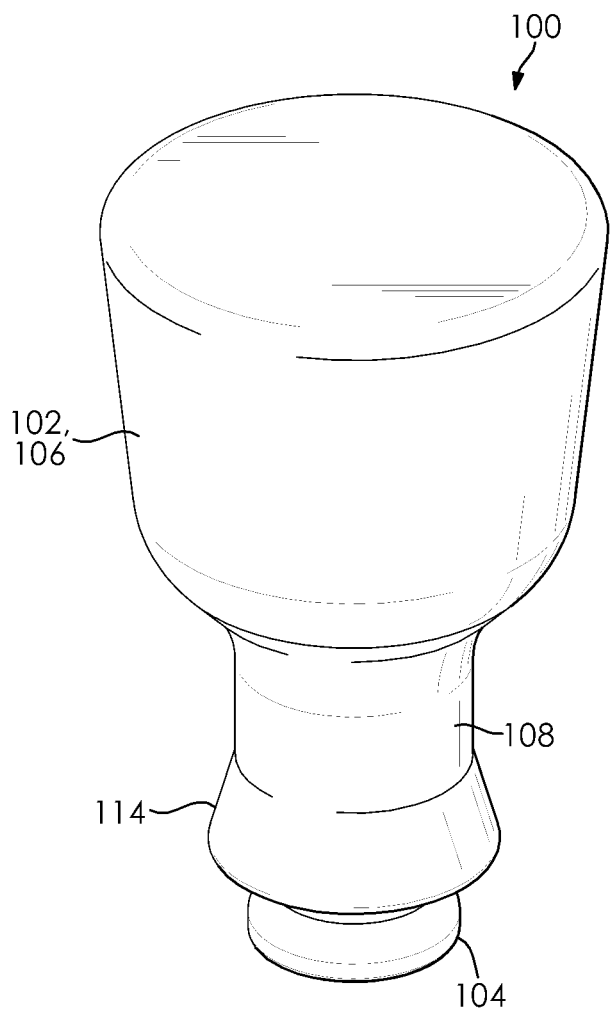
FIG. 2 is a bottom perspective view of the decanter system shown in FIG. 1.
Figure 3:
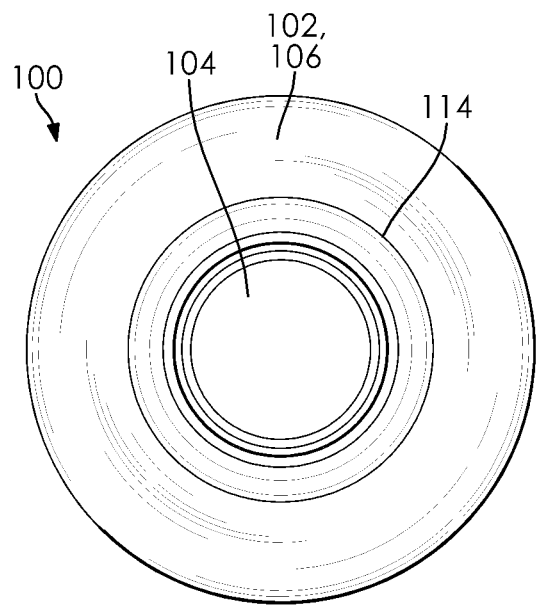
FIG. 3 is a top plan view of the decanter system shown in FIG. 1.
Figure 4:
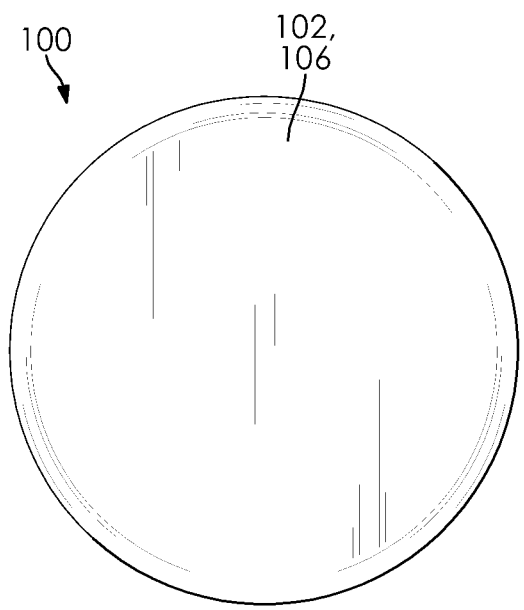
FIG. 4 is a bottom plan view of the decanter system shown in FIG. 1.

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-15, a decanter system 100 is shown. The decanter system 100 can be configured to receive and store liquids. In particular, the decanter system 100 can be configured to receive and store beverages. The beverages can include alcoholic spirits or wine, as non-limiting examples. The decanter system 100 can be utilized to impart additional flavors or enhance the flavor of the liquid. The decanter system 100 can be configured to mimic a traditional barrel aging process of the alcoholic spirit or the wine on a smaller scale. One aspect of the aging process in a barrel is the effect of different temperatures during different seasons which allow the spirit to expand and contract. This mild pressure differential allows the spirit in the barrel to move into the wood surface and draw out the flavor of the wood. This can be mimicked by the decanter system 100 of the present disclosure, as described in greater detail hereinbelow. It should be appreciated that the decanter system 100 of the present disclosure can be utilized with a variety of liquids such as beverages or oils, as non-limiting examples.

The decanter system 100 can include a decanter 102 and a stopper 104. In particular, the decanter 102 can be configured to receive the liquid and the stopper 104 can be configured to seal the decanter 102, as discussed in greater detail hereinbelow. The decanter 102 can be manufactured from a rigid material. The rigid material can be food-safe. As non-limiting examples, the decanter 102 can be fabricated from glass, wood, metal (e.g., stainless steel, aluminum), and/or a plastic material (e.g., polyethylene terephthalate, silicone, high density polyethylene, low density polyethylene, and polypropylene), and combinations thereof.

As shown in FIGS. 1-10 the decanter 102 can include a decanter body 106 and a neck 108. The neck 108 can extend outwardly from the decanter body 106. The decanter body 106 can include an interior portion 110 that is substantially hollow. The interior portion 110 of the decanter body 106 can be configured to hold a pre-determined volume of liquid. As a non-limiting example, the interior portion 110 of the decanter body 106 can be configured to hold 750 mL of liquid, which is equivalent to a standard bottle of commercially available spirits. A skilled artisan may select other suitable volumes for the interior portion 110 of the decanter body 106, as desired.

It should be appreciated that, in operation, the liquid can be disposed entirely within the interior portion 110 of the decanter body 106. Accordingly, in operation, the neck 108 can be configured to hold a volume of air above the interior portion 110 of the decanter body 106.

Figure 5:
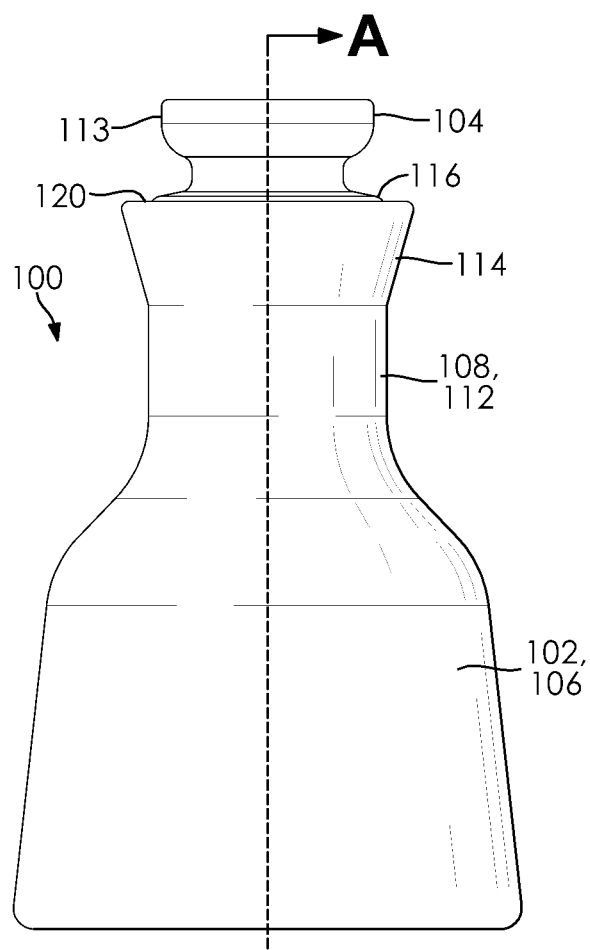
FIG. 5 is a front elevational view of the decanter system shown in FIG. 1
Figure 9:
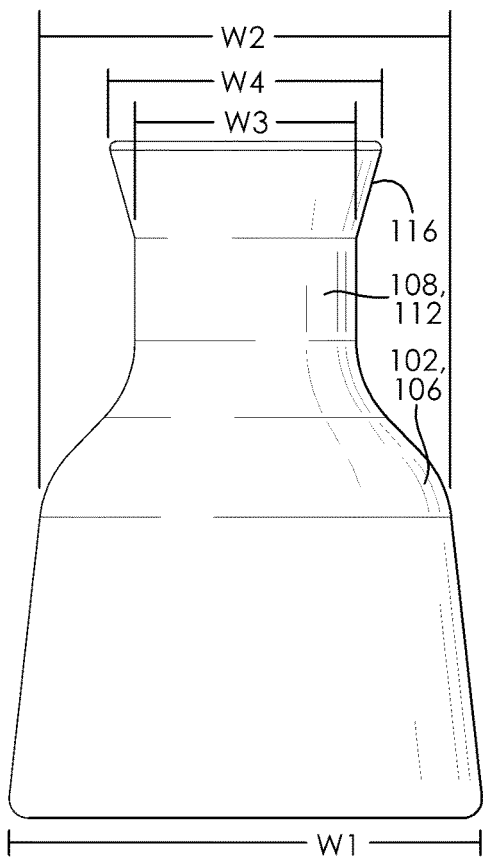
FIG. 9 is front elevational view of the decanter of FIG. 1, depicted without the stopper.
Figure 10:
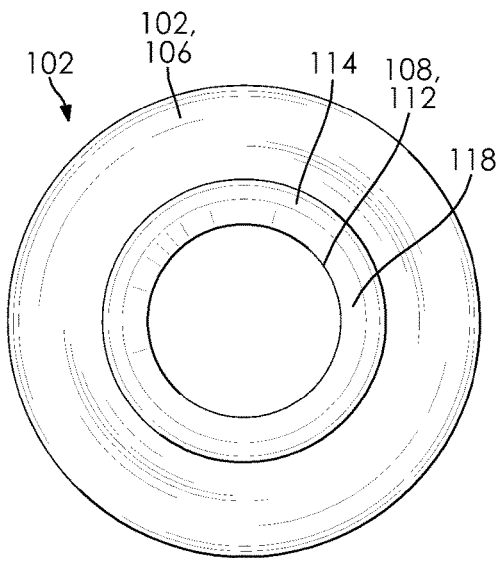
FIG. 10 is a top plan view of the decanter shown in FIG. 9.
Figure 11:
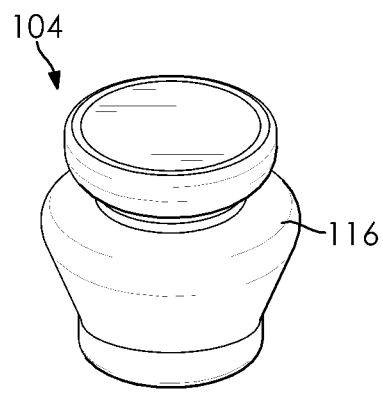
FIG. 11 is a top perspective view of the stopper of the decanter system of FIG. 1, depicted removed from the decanter.

The decanter body 106 can have a bottom portion with a width (W1), and a top portion with a width (W2). The width (W1) of the bottom portion can be larger than the width (W2) of the top portion. Accordingly, the decanter body 106 can taper from the bottom portion to the top portion, for example, as shown in FIGS. 5 and 9. It should be appreciated that a skilled artisan can select other suitable shapes for the decanter body 106, as desired.

The neck 108 can be disposed adjacent to the top portion of the decanter body 106. The neck 108 can be a hollow cylindrical portion 112 with a first end disposed on the decanter body 106 such that the neck is in fluid communication with the decanter body 106. A second end can have a mouth 114 and a lip 120 formed thereon. The mouth 114 can facilitate a smooth pour of the liquid from the decanter 102, in operation. The mouth 114 can be an angled wall that circumscribes the second end of the neck 108. As shown in FIGS. 1-5, the mouth 114 can receive the stopper 104, in operation.

Figure 7:
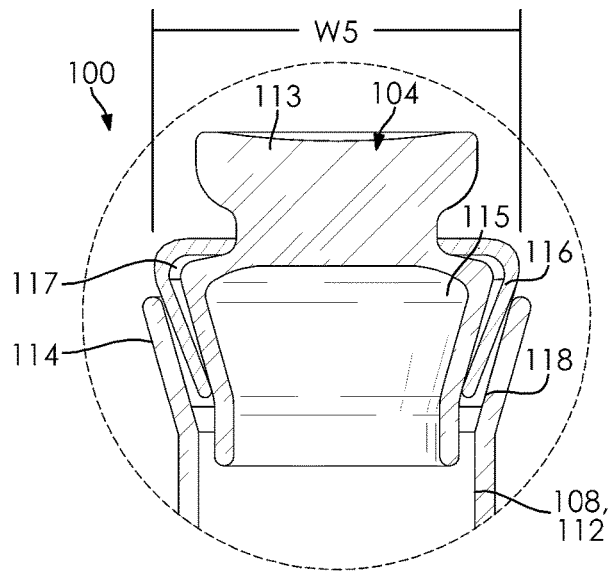
FIG. 7 is an enlarged, cross-sectional, front elevational view of the decanter system taken at callout B in FIG. 6, further depicts the stopper in a first position within the mouth of the decanter.

The neck 108 can have a width (W3), and the lip 120 can have a width (W4). The width (W3) of the neck 108 can be smaller than the width (W4) of the lip 120. It should be further appreciated, in certain embodiments, that the widths of the neck 108 (W3) and the lip 120 (W4) are each smaller than the widths of the decanter body (W1, W2), as shown in FIG. 7. The comparatively thinner width of the neck 108 can allow a user to more easily hold and pour from the decanter 102. The widths (W3) of the neck 108 and the width (W4) of the lip 120 can be larger than a width of a conventional decanter, in order to receive additional materials, as described in greater detail hereinbelow. A skilled artisan can select suitable dimensions for the widths (W1, W2, W3, and W4), as desired.

Figure 12:
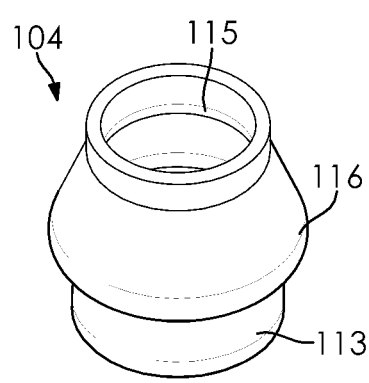
FIG. 12 is a bottom perspective view of the stopper of FIG. 11, further depicting the stopper where used as a drinking glass.
Figure 13:
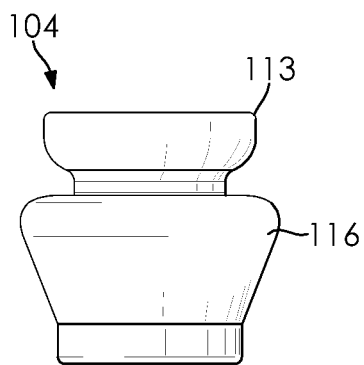
FIG. 13 is a front elevational view of the stopper shown in FIG. 12.
Figure 14:
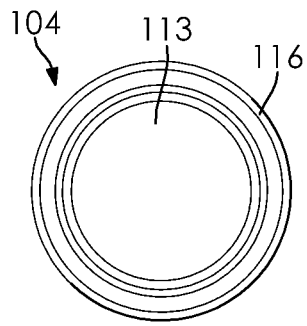
FIG. 14 is a top plan view of the stopper shown in FIG. 13.
Figure 15:
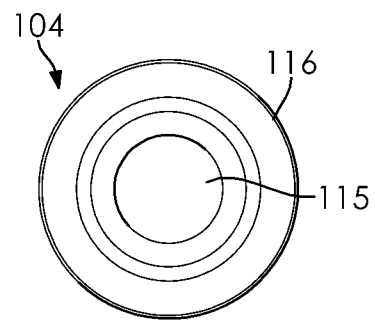
FIG. 15 is a bottom plan view of the stopper shown in FIG. 13.

With reference to FIGS. 11-15, the stopper 104 is shown. The stopper 104 can be configured to be disposed in the mouth 114 of the decanter 102. The stopper can have a handle or knob 113 disposed on a top portion thereof. It should be appreciated that the knob 113 may be solid or hollow, as desired. The stopper 104 can also have a hollow interior portion 115. Advantageously, the stopper 104 can be configured to be used as a drinking glass, for example, as shown in FIG. 12. The handle or knob 113 can be used as a base for the stopper, and the hollow interior portion 115 can be configured to receive the spirits or other liquids.

The stopper 104 can have a sealing member 116 disposed thereon. The stopper can have a width (W5) at the sealing member. The width (W5) of the sealing member can be greater than the width (W3) of the neck and less than the width (W4) of the mouth 114. Accordingly, where disposed in the mouth 114, the sealing member 116 can contact an interior surface 118 of the mouth 114. The sealing member 116 can be configured to form an airtight seal of the decanter 102.

The sealing member 116 can be fabricated from a flexible material. The flexible material can be sufficiently durable to be repeatedly inserted and removed from the decanter 102, in operation. As detailed hereinabove, the flexible material can be sufficiently flexible to allow for removal and insertion of the stopper 104, while forming the airtight seal at various displacements within the angled interior surface 118 of the mouth 114. As non-limiting examples, the flexible material of the sealing member 116 can be an elastomeric material, such as silicone or another rubber-like material, or a compressible cellular foam. A skilled artisan can select other suitable flexible materials for the sealing member 116 within the scope of the present disclosure.

The sealing member 116 can have dimensions that allow the sealing member to contact the interior surface 118 of the mouth 114 without the remainder of the stopper 104 contacting the interior surface 118 of the mouth 114. In operation, where the stopper 104 is disposed in the mouth 114, the stopper 104 can be spaced apart from the interior surface 118 of the mouth 114 by the sealing member 116.

Figure 6:
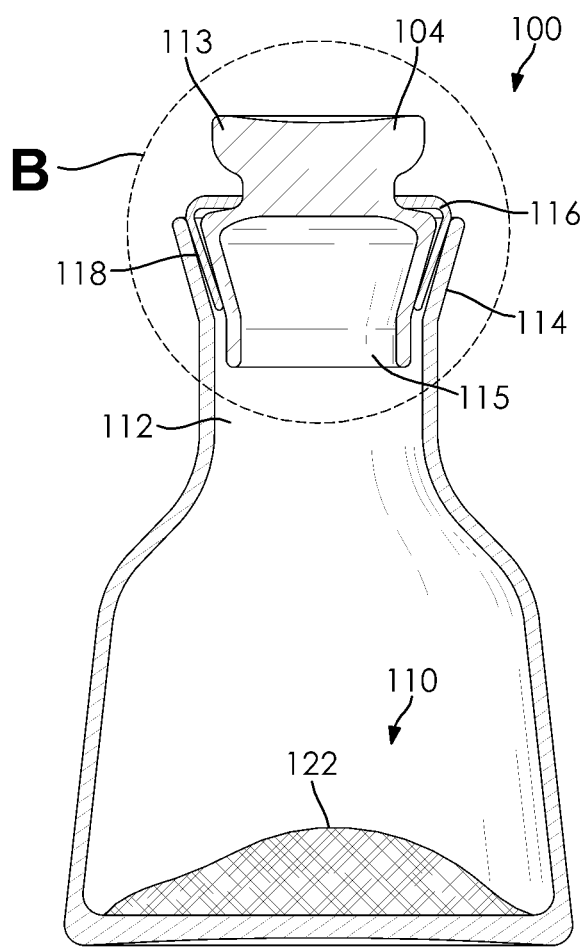
FIG. 6 is a cross-sectional front elevational view of the decanter system taken at section line A-A in FIG. 5, further depicting a sealing member of the stopper disposed in a mouth of the decanter to form an airtight seal and a filter disposed therein.
Figure 8:
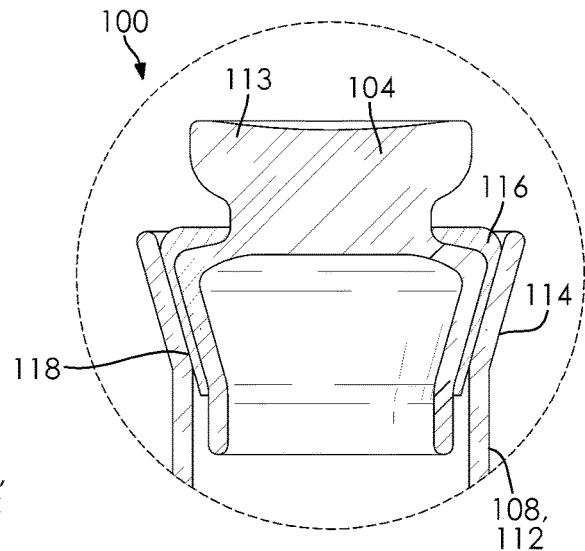
FIG. 8 is an enlarged, cross-sectional, front elevational view of the decanter system taken at callout B in FIG. 6, further depicts the stopper in a second position within the mouth of the decanter.

The sealing member 116 can have a D shape or a bulb shape, in cross-section, as shown in FIGS. 6-8. In certain embodiments, the sealing member 116 can have a hollow portion 117 or an air gap. The hollow portion 117 can allow the ring to be flexed and compressed, and can allow the sealing member 116 to expand when no longer compressed. The flexing and compressing of the bulb shape can allow the sealing member 116 to be depressed towards the stopper 104 allowing for a vertical movement of the stopper 104. Likewise, the sealing member 116 can expand or otherwise regain the bulb shape when removed from the mouth 114. For example, the hollow portion can allow the sealing member 116 to regain the bulb shape. In operation, the stopper 104 can be placed in the mouth 114 to form the air tight seal. The stopper can rest at a first position, as shown in the embodiment in FIG. 7. The user can push the stopper 104 further into the mouth 114; the sealing member 116 can be flexed and depressed and allow the stopper 104 to move downwards into the mouth 114 towards the neck 108 to a second position, as shown in the embodiment in FIG. 8. In the second position, the sealing member 116 can be deformed or the hollow portion can be compressed, which allows the sealing member to move to the second position. It should be appreciated that a movement of the stopper 104 can be permitted by a manual deformation of the sealing member 116 by the user.

It should be appreciated that the widths (W3) of the neck 108 and the width (W4) of the lip 120 can determine the relative size of the stopper 104 with the sealing member 116. Likewise, a displacement of the stopper 104 between the first position and the second position can be altered by the widths (W3) of the neck 108 and the width (W4) of the lip 120, the air gap 117 and additionally, the angle of the interior surface of the mouth 114. The wider the neck 108 and the lip 120 are, the smaller the displacement of the stopper 104 between the first position and the second position. The larger or wider the air gap 117, the larger the displacement. The displacement of the stopper 104 between the first position and the second position can affect the pressure differential on the liquid in the decanter 102, in operation. The larger the displacement of the stopper between the first position and the second position, the larger pressure differential between the first position and the second position.

It should be appreciated that after the airtight seal is formed, a volume of air can be sealed into the decanter 102, disposed in the neck 108 above the liquid in the decanter body 106. Accordingly, moving the stopper from the first position to the second position can increase the pressure on the volume of air in the neck 108 and the liquid in the decanter body 106. Likewise, moving the stopper from the second position to the first position can decrease the pressure on the volume of air in the neck 108 and the liquid in the decanter body 106. The stopper 104 can be moved between the first position and the second position without breaking the airtight seal formed between the sealing member 116 and the mouth 114. It should be appreciated that a change in pressure within the decanter 102 can be used to mimic long term barrel aging techniques used to age spirits.

As shown in FIG. 6, the decanter system 100 can include a filter 122. The filter 122 can be configured to receive various flavoring materials to be selected by the user, as desired. For example, the flavoring materials can be charred or toasted wood, fruits, herbs, and spices. The filter 122 can be a fine mesh bag, as a non-limiting example. The use of fine mesh can militate against sediment in the liquid, in operation. Desirably, the pressure change associated with the movement of the stopper 104 between the first position and the second position can force the liquid within the decanter into and out of the flavoring materials. This can allow for a flavor of the materials to be infused into the liquid. Advantageously, the filter 122 allows the user to select and customize flavoring materials to be disposed therein and impart a desired flavor into the spirit stored in the decanter 102.

The filter 122 can be a sealable bag. For example, the filter 122 can have a drawstring configured to secure the filter 122 in a closed position. The mesh can include pores that are smaller than those of the flavoring materials. The filter 122 can be fabricated from a plastic material, a paper material, a fabric material, or a metal material, as non-limiting examples. A skilled artisan can select other suitable filter materials, as desired.

Figure 16:
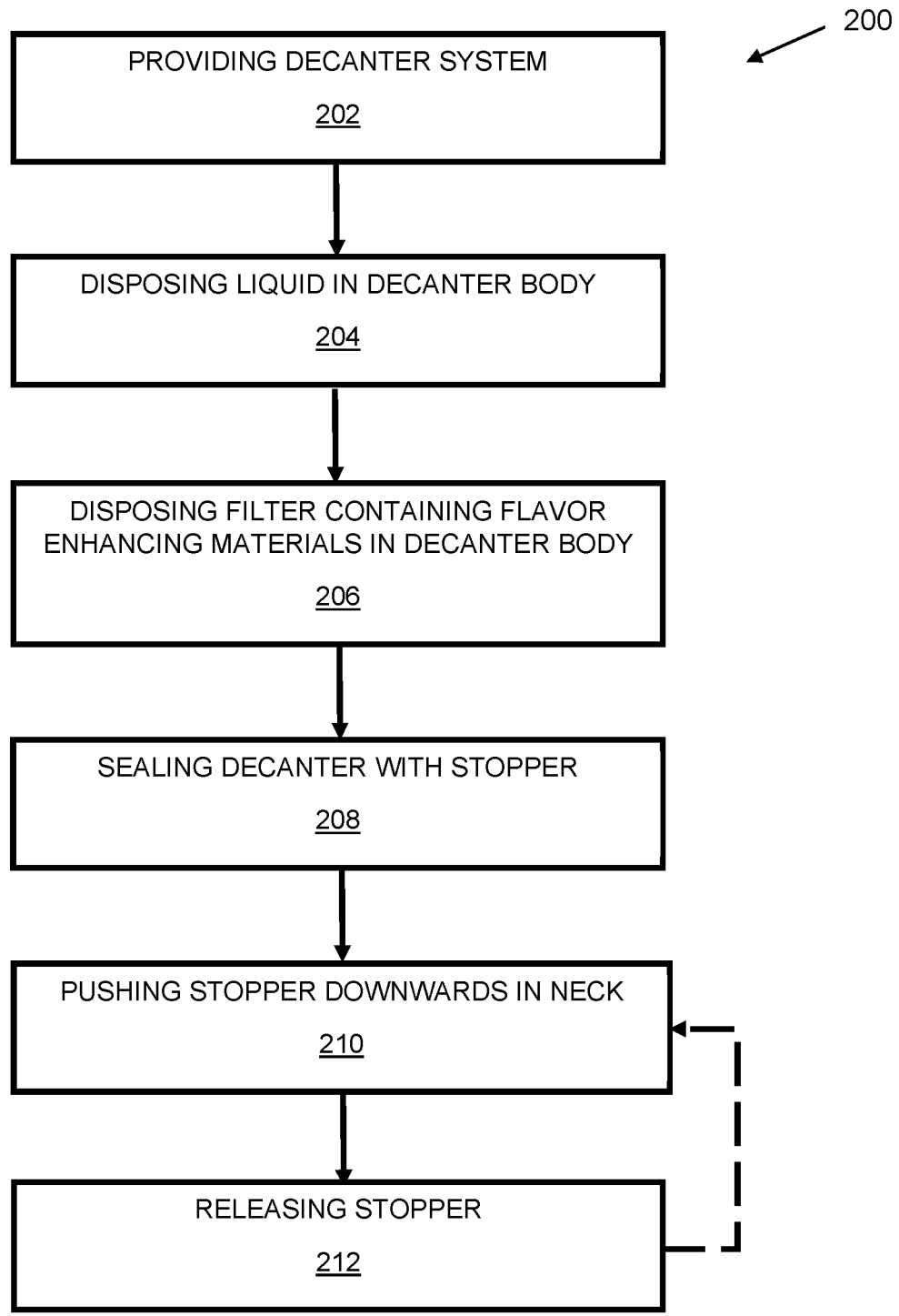
FIG. 16 is a flowchart illustrating a method of storing liquids according to another embodiment of the present disclosure.

The current disclosure further contemplates a method 200 for storing liquids, for example, as shown in FIG. 16. The method 200 can have a first step 202 of providing the decanter system 100 having a decanter 102, a stopper 104, and a filter 122, as described herein. A second step 204 can include disposing the liquids in the decanter body 106. The liquids can include wine, whiskey, or other spirits, water, and oils as desired. A third step 206 can include disposing the filter 122 with flavoring materials disposed therein in the decanter body 106. A fourth step 208 can include sealing the decanter 102 with the stopper 104. In particular, the stopper 104 can be disposed in the mouth 114 in the first position. The airtight seal can be formed between the mouth 114 and the sealing member 116, and the stopper can be spaced apart from the interior surface of the mouth 114. A fifth step 210 can include pushing the stopper downwards in the neck 108 to the second position. In particular, a user can push downward on the handle or knob 113 of the stopper 104 to compress or otherwise deform the sealing member 116. The stopper 104 can move vertically downward in the mouth 114 towards the neck 108 to the second position. The displacement of the stopper 104 from the first position to the second position can cause an increase in pressure on the liquids in the decanter 102.

The method 200 can also include a sixth step 212 where the stopper 104 is returned to the first position. The user can release the downward push on the stopper or pull on the handle or knob 113 of the stopper 104 to move the stopper from the second position to the first position and release the pressure. The sealing member 116 can decompress or regain its original shape as the stopper 104 is moved upward and the airtight seal is maintained. It should be appreciated that the fifth step 210 and the sixth step 212 of the method can be alternated and repeated, as desired, by the used to increase and decrease the pressure on the liquids in the decanter 102. The pressure change can increase the effect of the flavoring materials in the filter 122. Advantageously, the fifth step 210 and the sixth step 212 of the method can be used to mimic seasonal pressure variations that occur during conventional barrel aging methods.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A decanter system, comprising:
a decanter including a decanter body oriented on an elongate axis, a neck, and a mouth disposed on the neck and defining an opening, the mouth having an angled interior surface, wherein the angled interior surface is oriented outwardly toward the opening at an angle relative to the elongate axis; and
a stopper removably disposed in the mouth of the decanter, the stopper including
a ring shaped sealing member fabricated from an elastomeric material and having an inner surface, wherein the sealing member has a bulb shape in cross-section, and
a stopper body having
a hollow knob configured to be used as a base for the stopper when the stopper is used as a drinking glass when removed from the decanter, and
a hollow interior portion,
wherein the sealing member is disposed on an outer surface of the stopper body, with edge portions at a top and a bottom of the sealing member contacting the outer surface of the stopper body, and an air gap disposed between an internal portion of the inner surface of the sealing member and the outer surface of the stopper body,
wherein the stopper is selectively positioned in the mouth in a first position to form an airtight seal between the sealing member and the interior surface of the mouth, wherein the stopper is manually positionable in the mouth between the first position and a second position, the stopper in the second position being disposed further downwards into the mouth disposed on the neck compared to the stopper in the first position, and the airtight seal is maintained in each of the first position and the second position, wherein the air gap permits for a flexing of the sealing member and a movement of the internal portion inner surface of the sealing member toward the outer surface of the of the stopper body to compress the air gap against the angled interior surface of the mouth when the stopper is moved by a downward push on the stopper by a user from the first position to the second position, whereby the air gap is uncompressed in the first position and is compressed in the second position, the air gap when compressed causing the stopper to move from the second position to the first position when the user releases a downward push on the stopper without the user pulling the stopper, and wherein a pressure within an interior of the decanter is increased when the stopper moves from the first position to the second position, and the pressure is decreased when the stopper moves from the second position to the first position.

2. The decanter system of claim 1, further comprising a filter.

3. The decanter system of claim 2, wherein the filter is fabricated from a mesh.

4. The decanter system of claim 2, wherein the filter is configured to be selectively disposed in the decanter.

5. The decanter system of claim 2, wherein the filter is configured to receive flavoring materials, whereby a change in the pressure within the decanter is adapted to mimic long term barrel aging techniques used to age spirits or to infuse a flavor into a liquid stored in the decanter.

6. The decanter system of claim 5, wherein the filter receives flavoring materials, wherein the flavoring materials include a member selected from a group consisting of charred or toasted wood, fruits, herbs, spices, and combinations thereof.

7. The decanter system of claim 1, wherein the neck has a width and the mouth has a width, the width of the mouth being greater than the width of the neck.

8. The decanter system of claim 1, wherein the stopper is configured to hold a pre-determined volume of liquid.

9. The decanter system of claim 1, wherein a width of the hollow knob is less than the maximum width of the stopper.

10. A method of storing a liquid, comprising:
providing a decanter system having:
a decanter including a decanter body oriented on an elongate axis, a neck, and a mouth disposed on the neck and defining an opening, the mouth having an angled interior surface, wherein the angled interior surface is oriented outwardly toward the opening at an angle relative to the elongate axis; and
a stopper removably disposed in the mouth of the decanter, the stopper including
a ring shaped sealing member fabricated from an elastomeric material and having an inner surface, wherein the sealing member has a bulb shape in cross-section, and
a stopper body having
a hollow knob configured to be used as a base for the stopper when the stopper is used as a drinking glass when removed from the decanter, and
a hollow interior portion,
wherein the sealing member is disposed on an outer surface of the stopper body, with edge portions at a top and a bottom of the sealing member contacting the outer surface of the stopper body, and an air gap disposed between an internal portion of the inner surface of the sealing member and the outer surface of the stopper body,
wherein the stopper is selectively positioned in the mouth in a first position to form an airtight seal between the sealing member and the interior surface of the mouth,
wherein the stopper is manually positionable in the mouth between the first position and a second position, the stopper in the second position being disposed further downwards into the mouth disposed on the neck compared to the stopper in the first position, and the airtight seal is maintained in each of the first position and the second position,
wherein the air gap permits for a flexing of the sealing member and a movement of the internal portion of the inner surface of the sealing member toward the outer surface of the stopper body to compress the air gap against the angled interior surface of the mouth when the stopper is moved by a downward push on the stopper by a user from the first position to the second position, whereby the air gap is uncompressed in the first position and is compressed in the second position, the air gap when compressed causing the stopper to move from the second position to the first position when the user releases a downward push on the stopper without the user pulling the stopper, and
wherein a pressure within an interior of the decanter is increased when the stopper moves from the first position to the second position, and the pressure is decreased when the stopper moves from the second position to the first position;
disposing the liquid in the decanter body;
disposing a filter with flavoring material disposed therein in the decanter body;
sealing the decanter with the stopper in the first position; and
pushing the stopper downwards in the mouth to the second position.

11. The method of storing liquid of claim 10, further comprising a step of releasing the stopper to the first position while maintaining the seal after the step of pushing the stopper downwards to the second position.

12. The method of storing liquid of claim 11, wherein the step of releasing the stopper to the first position while maintaining the seal and the step of pushing the stopper downwards are alternatively and repeatedly performed a plurality of times.

* * * * *